E. A. POND.
Sphygmograph.
No. 205,412.  Patented June 25, 1878.
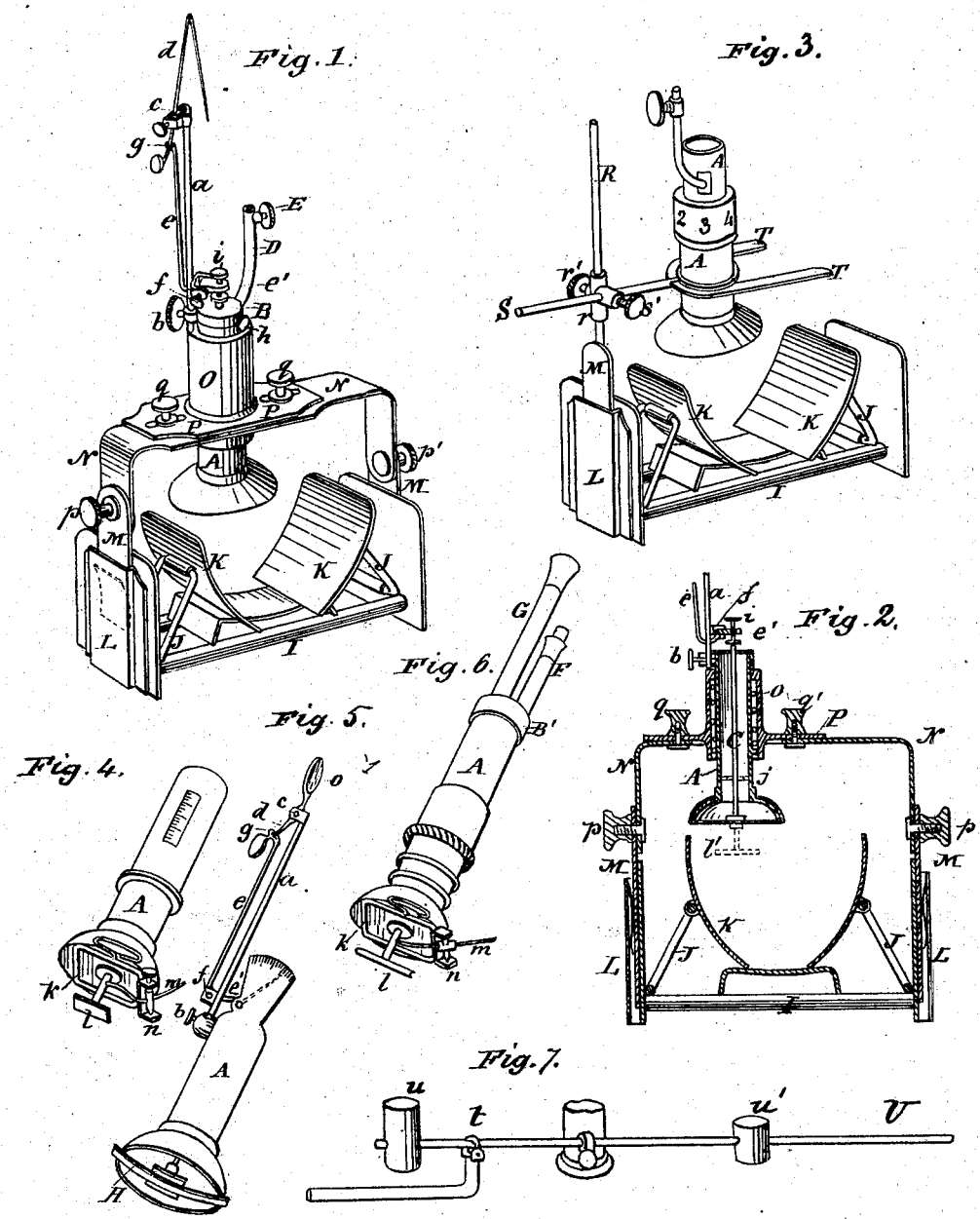

UNITED STATES PATENT OFFICE.

ERASMUS A. POND, OF RUTLAND, VERMONT.

IMPROVEMENT IN SPHYGMOGRAPHS.

Specification forming part of Letters Patent No. 205,412, dated June 25, 1878; application filed May 17, 1878.

*To all whom it may concern:*

Be it known that I, ERASMUS A. POND, of Rutland, in the county of Rutland and State of Vermont, have invented a new and useful Improvement in Sphygmographs, which improvement is fully set forth in the following specification.

This invention relates principally to sphygmographs—that is, instruments for graphically delineating or recording the movements of the pulse or any pulsating body. Some of the features of the invention, however, are applicable to sphygmoscopes as well.

My present invention is in many respects an improvement on those inventions comprised in Letters Patent No. 161,821, dated April 6, 1875; No. 167,785, dated September 14, 1875; and No. 183,205, dated October 10, 1876. It embodies many of the features shown in said patented apparatus. It, however, possesses other features not found in the same, some of which are applicable not only to sphygmoscopes operating on the principle set forth in said patents, but also to the old form of sphygmograph.

The nature of my said invention, and the manner in which the same is or may be carried into effect, will be understood by reference to the accompanying drawings.

In the instruments before referred to, for which Letters Patent of the United States were issued to me, liquid was employed either directly to indicate vibrations or pulsations of bodies, or, through the medium of floats, graphically to delineate the same. I have found that liquid may be dispensed with, and that the instrument may be constructed to directly transmit the pulsations or vibrations to a rod, with which may be combined a system of levers, whereby motion can be transmitted in a magnified form to a marking-instrument or other recording device.

In the drawings I have shown an arrangement and modification of my said instrument, whereby the same can be used both with or without liquid, or whereby the same instrument can be used for various purposes by the employment of an interchangeable piece. To this effect, I construct the receptacle or cylinder A substantially in the same manner as shown in my said Letters Patent No. 183,205; but I use in connection with it interchangeable caps B. The one is shown in Figures 1 and 2. It is a mere cover, centrally perforated, through which the stem or the terminal rod C passes.

For convenience, to the same cap may be attached, as shown in said figures, the socket-piece D, to hold, by means of set-screw E, the mechanism which feeds the material upon which the marking-instrument is recording or tracing the vibrations imparted to it. It may also have attached to it a ring or sleeve holding the standard *a* by means of a set-screw, *b*. It may, further, have, to perfectly secure the same to the cylinder A, another set-screw, *h*. (Shown in Fig. 1.) This cap-piece, with its appurtenances, is used in connection with the instrument when pulsations or vibrations are directly transmitted by contact of said terminal rod C with an elastic diaphragm closing the bell-shaped opening, or with the vibratory or pulsating body itself. But when the instrument is to be used in connection with liquid, then I substitute for the cap B a cap such as shown in Fig. 2 in my said Letters Patent No. 183,205, or a modification of the same, by dispensing with the piston and packing, but using in lieu thereof a cap, B', (see Fig. 6,) provided with a second tube, F, through which liquid can be poured into the cylinder. This tube can be closed by means of a stopper or cock, and therefore affords the means both of preventing evaporation of liquid and of regulating the column of liquid in the tube G. This cap may be combined with the pendulous-lever arrangement and recording apparatus shown in said Letters Patent No. 183,205, or the one described in connection with cap B, and shown in Fig. 1, or with any other suitable marking or recording instrument.

In some cases I have also dispensed with the membrane, by arranging the instrument so as to contain a delicate wire or rod, C, provided at its lower extremity with a pad or disk, directly resting upon the vibrating body.

In the sphygmograph last patented to me I have shown a system of levers so balanced and hung upon delicate fulcra that the slightest vibration could be communicated with considerable accuracy.

I have found, however, that a more perfect arrangement, attended with less friction, and operating as perfectly, (shown in Figs. 1, 2, and 5,) consists of the following: A standard, $a$, being a rod, the position of which in relation to the instrument is adjustable by means of a set-screw, $b$, carries at its upper end the fulcrum or pivotal axis $c$ of the pendulous lever $d$, described and shown in my previous patent of October 10, 1876. Instead of directly connecting the pendulous lever by means of a third lever-arm in contact with a float or other device receiving the vibrations, it is combined with such device by means of an angular lever, $e\ e'$, having its point of oscillation at $f$. The long arm $e$ of said angular lever terminates at its upper end in an eye, $g$, which engages the lower arm of the pendulous lever $d$. The short arm $e'$ is provided at its extremity with a small disk, which may rest directly upon the terminal rod C.

For convenience of adjustment, the disk $e'$ may be provided with an adjusting-screw, $i$, having at its lower end a disk, and its upper end a milled head. By means of this arrangement the instrument can be adjusted with utmost nicety.

To obviate possibility (during the vibrations) of the short lever-arm or disk $e'$ coming out of contact with the float or terminal rod, permanent connection can be effected by means of a small piece of soft-iron wire, which may be secured in the upper end of the glass float, and by making the short arm or disk intended to be in contact with the float of magnetized iron. In this way loss of motion, however small, can be prevented.

Heretofore the sphygmograph-tube containing the liquid was closed at its lower extremity by means of an elastic diaphragm. Such diaphragm can be used advantageously in instruments operating without any liquid, the terminal rod C resting directly upon the diaphragm, as shown in Fig. 2; but the diaphragm may also be dispensed with, and in lieu of it a delicate spring, H, Fig. 5, extending from one side to the other of the bell-mouthed opening, may support the terminal rod.

I have made instruments in which even this spring is dispensed with, the rod being held loosely in suspension in the tube, to freely vibrate up and down in suitable guides $j$, Fig. 2, when in contact with or resting upon a vibrating body. Of course, the rod should be provided with suitable stays or lugs, to prevent it from dropping below the plane of the opening of the tube A.

Sometimes it is necessary or expedient to avoid or reduce to a minimum pressure upon the artery the pulsations of which are to be examined. To this effect, I use, in connection with my instrument, an attachment fitted over the mouth of the tube, consisting of a light and delicate wire frame, $k$, (see Figs. 4 and 6,) held in place by means of spring-clasps made of the same wire. In the center of the wire frame is suspended a double stud, or two light metal disks, $l$, united by central shank or spindle. These disks may be made as small as desirable, and of any form, either quadrangular, round, oval, or other shape.

The mode of suspending this double stud is shown in the drawings to consist of a properly-balanced lever, $m$, held in pivotal bearings $n$; but I propose to use in lieu of the lever a simple centrally-perforated cross-bar, through which the shank of the stud passes, and within which it is free to play.

As an attachment to the diaphragm instrument shown in section in Fig. 2, to be used in cases where, for the purposes of delicate observation, the diaphragm should not press the artery, I provide a disk, $l'$, (shown in dotted lines,) the shank of which has a screw-threaded point, whereby it may be screwed into the lower part of the terminal rod, through the center of the diaphragm.

In some cases the excessive delicacy of the instrument is an objection, and is a serious obstacle to ready observation and to practical results being speedily obtained. In such cases the diaphragm is preferred, and an india-rubber flat air-cushion may be used for such diaphragm to soften the vibrating effects on the terminal rod and marking mechanism.

I have also found from practical experience and experiment that a mirror, $o$, attached to the pendulous lever, arranged as shown in Fig. 5, to receive the rays of sunlight, or the light from an artificial source, furnishes a desirable means of determining vibrations. A suitable screen may be arranged and the light reflected thereon, and its reflection will be seen to move, and thus exhibit to the eye all the fluctuations or vibrations. By increasing or diminishing the distance of the screen from the mirror the vibrations will be more or less magnified.

Plain or slightly-concave mirrors of metal or glass are to be preferred, and, with the aid of a camera and movable sensitive paper, the pulse or vibrations may be photographed.

For the adjustment of the instrument to the pulse I have made use of various contrivances, such as clamps or supports (shown in Letters Patent before referred to,) metal or elastic bands, &c. But I have found that it is of the utmost importance to properly secure the wrist, and to press upon the pulse with but slight pressure; otherwise inaccurate or deceptive indications would result. To effect these objects I have devised a wrist-holder, (shown in Figs. 1, 2, and 3,) consisting of a three-sided frame, I, from the opposite angles of which project oblique stays J, to which are hinged at their centers curved leaves K. This simple arrangement allows the wrist or arm to fit itself to any position, whatever its shape or size; for it will be understood that the leaves, being free to rotate on their hinges, will adapt themselves, by convergence or divergence, to any object interposed between them. This capacity of self-adjustment led me to call the holder the "Universal Arm or Wrist Holder."

To steadily hold the instrument with requisite pressure upon the pulse, I have provided the upright sides of the frame I with pockets L, each containing a spring. These pockets are arranged to hold, by friction, the shank or shanks of the instrument-holder in any position in which it may be set.

In the drawings I have shown two systems of holders, which I deem mere mechanical equivalents, although the one may possess advantages over the other in certain applications. The one represented in Figs. 1 and 2 consists of a yoke, N, adjustably connected by means of set-screws $p\ p'$ with the shank M. This yoke has on top an elongated slot, for the admission through it of the instrument, which is held in a tubular casing, O, by means of a helical spring, so as to bear downward with yielding pressure. The tubular casing is provided with slotted ears or plates P, resting upon the yoke, and set-screws $q\ q'$, by which the instrument containing tubular casing may be adjusted as to the point of application.

The instrument is therefore set in the manner as follows: It is raised by sliding the shanks of the holder up in the pockets to let the arm or wrist in upon the support. It is then depressed until the instrument touches with the requisite pressure the pulse, and, according to the shape of the arm or wrist and location of the pulse, the instrument is shifted sidewise or tilted on the set-screws $p$ and $p'$.

The other and more simple system of holders consists of a standard, R, attached to the shank M, upon which standard a sliding sleeve, $r$, may be set in any position by means of set-screw $r'$. The sleeve $r$ carries, also, a tubular lug, through which passes transversely a rod, S, which may be set horizontally in any given position by set-screw S'.

On the end of the sliding rod S is a yoke, T, the two arms of which embrace and hold the tubular casing of the instrument, as shown in Fig. 3. The operation of this holder is substantially like that of the previously-described holder. The yoke, it will be understood, is capable of all the adjustments as to elevation, inclination, and distance from the standard.

To accurately weigh the pressure of the instrument upon the pulse, instead of the yoke T a scale-beam, U, may be used, having its fulcrum at $t$. The instrument on the one is balanced by the sliding weight $u$ on the other side of the fulcrum, and the auxiliary weight $u'$ is then slid along the beam until the requisite pressure is produced.

Instead of weights, delicate springs may be used to measure, and dials to indicate the pressure.

The terminal rod may also be provided with a rack, meshing in with a pinion, which may gear with a segmental rack on the short lever $e$; and the pinion may have an outside hand, indicating on a graduated dial the precise pressure of the instrument, as shown in Fig. 5.

Again, when a movable sleeve or tubular casing is employed in connection with the instrument, it (the sleeve) may be made to slide or screw up and down like an opera-glass, and thus adjust the normal pressure of the instrument. Such an arrangement is shown in Fig. 6.

To determine the pressure, I graduate the tube of the instrument, as shown in Fig. 4. The position of the latter in relation to the sleeve will indicate the pressure, which can thus be conveniently read.

In conclusion, 1 would observe that I have used my instrument not only for tracing or graphically representing pulsations, but also for writing and recording the sound of the heart or the valvular murmurs.

Having thus described my said invention, what I claim, and desire to secure by Letters Patent, is—

1. In a sphygmograph, the combination, with a suitable upright tubular holder or frame, of a wire or rod arranged, substantially as shown and described, to come in contact with the vibratory or pulsating body, directly or through the medium of an elastic membrane, spring, or other body, substantially as shown and set forth.

2. In a sphygmograph, the combination, with a magnetized steel arm of the pendulous needle, of a soft-iron-wire-tipped float, substantially as and for the purposes set forth.

3. The apparatus for transmitting the vibrations of vibratory or pulsating bodies to a pendulous lever and its jointed marking-needle by means of a system of levers, substantially as shown and described—that is to say, by the combination, with the weighted arm of the pendulous lever, of an angle-lever oscillating upon a point stationary relatively to the holder of the instrument, the short arm of which lever rests upon the terminal rod, while its longer arm engages the short arm of the pendulous lever, and has movable connection therewith, all substantially as shown and set forth.

4. As a means of adjustment of the lever-connection with the terminal rod, the interposition between the short arm of the angle-lever and terminal rod, and whether applied to the one or to the other, of a screw pad or disk, operating substantially as shown and set forth.

5. In a sphygmograph, to be used in connection with or without an elastic diaphragm or spring, but as an attachment to the bell-mouthed or otherwise suitably-shaped base of the instrument, the double disk, united by a shank loosely held in a frame or clasp, substantially as shown and described.

6. In apparatus for determining or recording the movement of pulsating or vibratory bodies, and in combination with a system of levers for the transmission of the movement of a rod or float actuated by such pulsation or vibrations, a mirror on the end of the pendulous lever, for use in connection with suitable screen or photographic means, substantially as shown and set forth.

7. In combination with a sphygmograph, the wrist-support, adapted to adjust itself to the wrist resting thereon, substantially as shown and set forth.

8. In combination with the self-adjusting wrist-support, the frame for holding the sphygmograph in position over the wrist, substantially as shown and set forth.

9. The combination of a sphygmograph wrist-support and frame, and means for adjusting the position of said sphygmograph laterally as well as in relation to height and angle, or either of them, substantially as shown and set forth.

10. The combination, with a sphygmograph, of a spring or weighted lever and scale, to regulate and determine its pressure upon the body whose pulsations or vibrations are to be measured or graphically represented.

In testimony whereof I have signed this specification in the presence of two subscribing witnesses.

E. A. POND.

Witnesses:
   WM. CHAS. BROWN,
   H. M. BAILEY.